(12) United States Patent
Iodice et al.

(10) Patent No.: US 11,921,928 B2
(45) Date of Patent: Mar. 5, 2024

(54) HAPTIC EFFECTS FROM FOCUSED ACOUSTIC FIELDS

(71) Applicant: ULTRAHAPTICS IP LTD, Bristol (GB)

(72) Inventors: Michele Iodice, Bristol (GB); Brian Kappus, Mountain View, CA (US); Benjamin John Oliver Long, Bristol (GB)

(73) Assignee: Ultrahaptics IP Ltd, Bristol (GB)

( * ) Notice: Subject to any disclaimer, the term of this patent is extended or adjusted under 35 U.S.C. 154(b) by 0 days.

(21) Appl. No.: 18/066,267

(22) Filed: Dec. 14, 2022

(65) Prior Publication Data

US 2023/0117919 A1   Apr. 20, 2023

Related U.S. Application Data

(62) Division of application No. 16/198,959, filed on Nov. 23, 2018, now Pat. No. 11,531,395.

(Continued)

(51) Int. Cl.
*G10K 11/34* (2006.01)
*G06F 3/01* (2006.01)
(Continued)

(52) U.S. Cl.
CPC .............. *G06F 3/016* (2013.01); *G06F 3/017* (2013.01); *G06F 3/0304* (2013.01);
(Continued)

(58) Field of Classification Search
CPC ........ G06F 3/016; G06F 3/017; G06F 3/0304; G06F 3/03545; G06F 3/038; G10K 11/34
See application file for complete search history.

(56) References Cited

U.S. PATENT DOCUMENTS

| 4,218,921 A | 8/1980 | Berge |
| 4,760,525 A | 7/1988 | Webb |

(Continued)

FOREIGN PATENT DOCUMENTS

| CA | 2470115 A1 | 6/2003 |
| CA | 2909804 A1 | 11/2014 |

(Continued)

OTHER PUBLICATIONS

"Welcome to Project Soli" video, https://atap.google.com/#project-soli Accessed Nov. 30, 2018, 2 pages.

(Continued)

*Primary Examiner* — Stephen G Sherman
(74) *Attorney, Agent, or Firm* — Koffsky Schwalb LLC; Mark I. Koffsky

(57) ABSTRACT

To resolve an issue related to the calibration of optical cameras in transducer-based mid-air haptic systems, the magnification of the motion induced on an optical camera by an acoustic field modulated at specific frequencies reveals very small temporal variations in video frames. This quantized distortion is used to compare different acoustic fields and to solve the calibration problem in an automatized manner. Further, mechanical resonators may be excited by ultrasound when it is modulated at the resonant frequency. When enough energy is transferred and when operating at the correct frequency, a user in contact with the device can feel vibration near areas of largest displacement. This effect can be exploited to create devices which can produce haptic feedback while not carrying a battery or exciter when in the presence of an ultrasonic source.

16 Claims, 8 Drawing Sheets

Related U.S. Application Data

(60) Provisional application No. 62/590,609, filed on Nov. 26, 2017, provisional application No. 62/691,130, filed on Jun. 28, 2018.

(51) Int. Cl.
*G06F 3/03* (2006.01)
*G06F 3/0354* (2013.01)
*G06F 3/038* (2013.01)

(52) U.S. Cl.
CPC .......... *G06F 3/03545* (2013.01); *G06F 3/038* (2013.01); *G10K 11/34* (2013.01)

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,226,000 A | 7/1993 | Moses |
| 5,235,986 A | 8/1993 | Maslak |
| 5,243,344 A | 9/1993 | Koulopoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,098,951 B2 | 8/2021 | Kappus |
| 11,113,860 B2 | 9/2021 | Rigiroli |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,714,492 B2 | 8/2023 | Carter |
| 11,715,453 B2 | 8/2023 | Kappus |
| 11,727,790 B2 | 8/2023 | Carter |
| 2001/0007591 A1 | 7/2001 | Pompei |
| 2001/0033124 A1 | 10/2001 | Norris |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0094317 A1 | 4/2007 | Wang |
| 2007/0177681 A1 | 8/2007 | Choi |
| 2007/0214462 A1 | 9/2007 | Boillot |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |

(56) References Cited

U.S. PATENT DOCUMENTS

| | | |
|---|---|---|
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0267156 A1 | 9/2018 | Carter |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |

(56) References Cited

U.S. PATENT DOCUMENTS

| | | |
|---|---|---|
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0193269 A1 | 6/2020 | Park |
| 2020/0218354 A1 | 7/2020 | Beattie |
| 2020/0257371 A1 | 8/2020 | Sung |
| 2020/0294299 A1 | 9/2020 | Rigiroli |
| 2020/0302760 A1 | 9/2020 | Carter |
| 2020/0320347 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Long |
| 2021/0111731 A1 | 4/2021 | Long |
| 2021/0112353 A1 | 4/2021 | Kappus |
| 2021/0141458 A1 | 5/2021 | Sarafianou |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0035479 A1 | 2/2022 | Lasater |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0124704 A1 | 4/2023 | Buckland |
| 2023/0141896 A1 | 5/2023 | Liu |
| 2023/0168228 A1 | 6/2023 | Kappus |
| 2023/0215248 A1 | 7/2023 | Lowther |
| 2023/0228857 A1 | 7/2023 | Carter |
| 2023/0251720 A1 | 8/2023 | Wren |
| 2023/0259213 A1 | 8/2023 | Long |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2017172006 | 10/2017 |
| WO | 2018109466 A1 | 6/2018 |
| WO | 2020049321 A2 | 3/2020 |
| WO | 2021130505 A1 | 7/2021 |
| WO | 2021260373 A1 | 12/2021 |

OTHER PUBLICATIONS

A. B. Vallbo, Receptive field characteristics of tactile units with myelinated afferents in hairy skin of human subjects, Journal of Physiology (1995), 483.3, pp. 783-795.

A. Sand, Head-Mounted Display with Mid-Air Tactile Feedback, Proceedings of the 21st ACM Symposium on Virtual Reality Software and Technology, Nov. 13-15, 2015 (8 pages).

Alexander, J. et al. (2011), Adding Haptic Feedback to Mobile TV (6 pages).

Almusawi et al., "A new artificial neural network approach in solving inverse kinematics of robotic arm (denso vp6242)." Computational intelligence and neuroscience 2016 (2016). (Year: 2016).

(56) References Cited

OTHER PUBLICATIONS

Amanda Zimmerman, The gentle touch receptors of mammalian skin, Science, Nov. 21, 2014, vol. 346 Issue 6212, p. 950.
Anonymous: "How does Ultrahaptics technology work?— Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv:1809.08097 (2018) (Year: 2018).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Malgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (vol. 2, pp. 1091-1094).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (dated Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021.
EPO Application 18 725 358.8 Examination Report dated Sep. 22, 2021.
EPO Communication for Application 18 811 906.9 (dated Nov. 29, 2021) (15 pages).
EPO Examination Report 17 748 4656.4 (dated Jan. 12, 2021) (16 pages).
EPO Examination Search Report 17 702 910.5 (dated Jun. 23, 2021).
EPO ISR and WO for PCT/GB2022/050204 (dated Apr. 7, 2022) (15 pages).
EPO Office Action for EP16708440.9 dated Sep. 12, 2018 (7 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Guez, "Solution to the inverse kinematic problem in robotics by neural networks." In Proceedings of the 2nd International Conference on Neural Networks, 1988. San Diego, California. (Year: 1988) 8 pages.
Mahboob, "Artificial neural networks for learning inverse kinematics of humanoid robot arms." MS Thesis, 2015. (Year: 2015) 95 pages.
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Dec. 22, 2022 for U.S. Appl. No. 17/457,663 (pp. 1-20).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).

(56) References Cited

OTHER PUBLICATIONS

Office Action dated Apr. 18, 2019 for U.S. Appl. No. 16/296,127 (pags 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, dated Apr. 12, 2019, 14 pages.
Partial ISR for Application No. PCT/GB2020/050013 dated May 19, 2020 (16 pages).
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 dated Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
EPSRC Grant summary EP/J004448/1 (dated 2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.

(56) References Cited

OTHER PUBLICATIONS

Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al . . . Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOct. 2009 pp. 139-148.
Hoshi et al.,Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=gb (Accessed May 29, 2022).
Hua J, Qin H., Haptics-based dynamic implicit solid modeling, IEEE Trans Vis Comput Graph. Sep.-Oct. 2004;10 (5):574-86.

Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, dated Apr. 11, 2019, 14 pages.
International Search Report and Written Opinion for Application No. PCT/GB2018/053739, dated Jun. 4, 2019, 16 pages.
International Search Report and Written Opinion for Application No. PCT/GB2019/050969, dated Jun. 13, 2019, 15 pages.
International Search Report and Written Opinion for Application No. PCT/GB2019/051223, dated Aug. 8, 2019, 15 pages.
International Search Report and Written Opinion for Application No. PCT/GB2019/052510, dated Jan. 14, 2020, 25 pages.
Invitatioin to Pay Additional Fees for PCT/GB2022/051821 (Oct. 20, 2022).
ISR & WO for PCT/GB2020/052545 (dated Jan. 27, 2021) 14 pages.
ISR & WO For PCT/GB2021/052946, 15 pages.
ISR & WO for PCT/GB2022/051388 (dated Aug. 30, 2022) (15 pages).
ISR and WO for PCT/GB2020/050013 (dated Jul. 13, 2020) (20 pages).
ISR and WO for PCT/GB2020/050926 (dated Jun. 2, 2020) (16 pages).
ISR and WO for PCT/GB2020/052544 (dated Dec. 18, 2020) (14 pages).
ISR and WO for PCT/GB2020/052829 (dated Feb. 10, 2021) (15 pages).
ISR and WO for PCT/GB2021/052415 (dated Dec. 22, 2021) (16 pages).
ISR for PCT/GB2020/052546 (dated Feb. 23, 2021) (14 pages).
ISR for PCT/GB2020/053373 (dated Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA,IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.

(56) References Cited

OTHER PUBLICATIONS

Jonathan Tompson et al., Real-Time Continuous Pose Recovery of Human Hands Using Convolutional Networks, ACM Trans. Graph. 33, 5, Article 169, Aug. 2014, pp. 1-10.
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,,Curved acceleration path of ultrasound-driven air flow, J. Appl. Phys. 125, 054902 (2019).
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Sysgtems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD-Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahdi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: I0.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adversarial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).

(56) References Cited

OTHER PUBLICATIONS

Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https://doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-362.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI Apr. 26, 2014-May 1, 2014, Toronto, Ontario, Canada. (10 pages).
Wooh et al., "Optimum beam steering of linear phased arays," Wave Motion 29 (1999) pp. 245-265, 21 pages.
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI Apr. 27, 2013-May 2, 2013 (10 pages).
Office Action (Final Rejection) dated Mar. 14, 2022 for U.S. Appl. No. 16/564,016 (pp. 1-12).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).

(56) References Cited

OTHER PUBLICATIONS

Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).

Cappellari et al., "Identifying Electromyography Sensor Placement using Dense Neural Networks." In Data, pp. 130-141. 2018. (Year: 2018).
ISR and WO for PCT/GB2023/050001 (dated May 24, 2023) (20 pages).
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Office Action (Ex Parte Quayle Action) dated Jul. 20, 2023 for U.S. Appl. No. 16/843,281 (pp. 1-15).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Aksel Sveier et al.,Pose Estimation with Dual Quaternions and Iterative Closest Point, 2018 Annual American Control Conference (ACC) (8 pages).
JP Office Action for JP 2020-534355 (dated Dec. 6, 2022) (8 pages).
Ken Wada, Ring Buffer Basics (2013) 6 pages.
Notice of Allowance dated Feb. 23, 2023 for U.S. Appl. No. 18/060,556 (pp. 1-10).
Office Action (Final Rejection) dated Mar. 21, 2023 for U.S. Appl. No. 16/995,819 (pp. 1-7).
Office Action (Non-Final Rejection) dated Mar. 1, 2023 for U.S. Appl. No. 16/564,016 (pp. 1-10).
Office Action (Non-Final Rejection) dated Mar. 22, 2023 for U.S. Appl. No. 17/354,636 (pp. 1-5).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action dated Feb. 9, 2023 for U.S. Appl. No. 18/060,556 (pp. 1-5).

(56) References Cited

OTHER PUBLICATIONS

Office Action dated Mar. 3, 2023 for U.S. Appl. No. 18/060,525 (pp. 1-12).
Partial ISR for PCT/GB2023/050001 (dated Mar. 31, 2023) 13 pages.
Rakkolainen et al., A Survey of Mid-Air Ultrasound Haptics and Its Applications (IEEE Transactions on Haptics), vol. 14, No. 1, 2021, 18 pages.

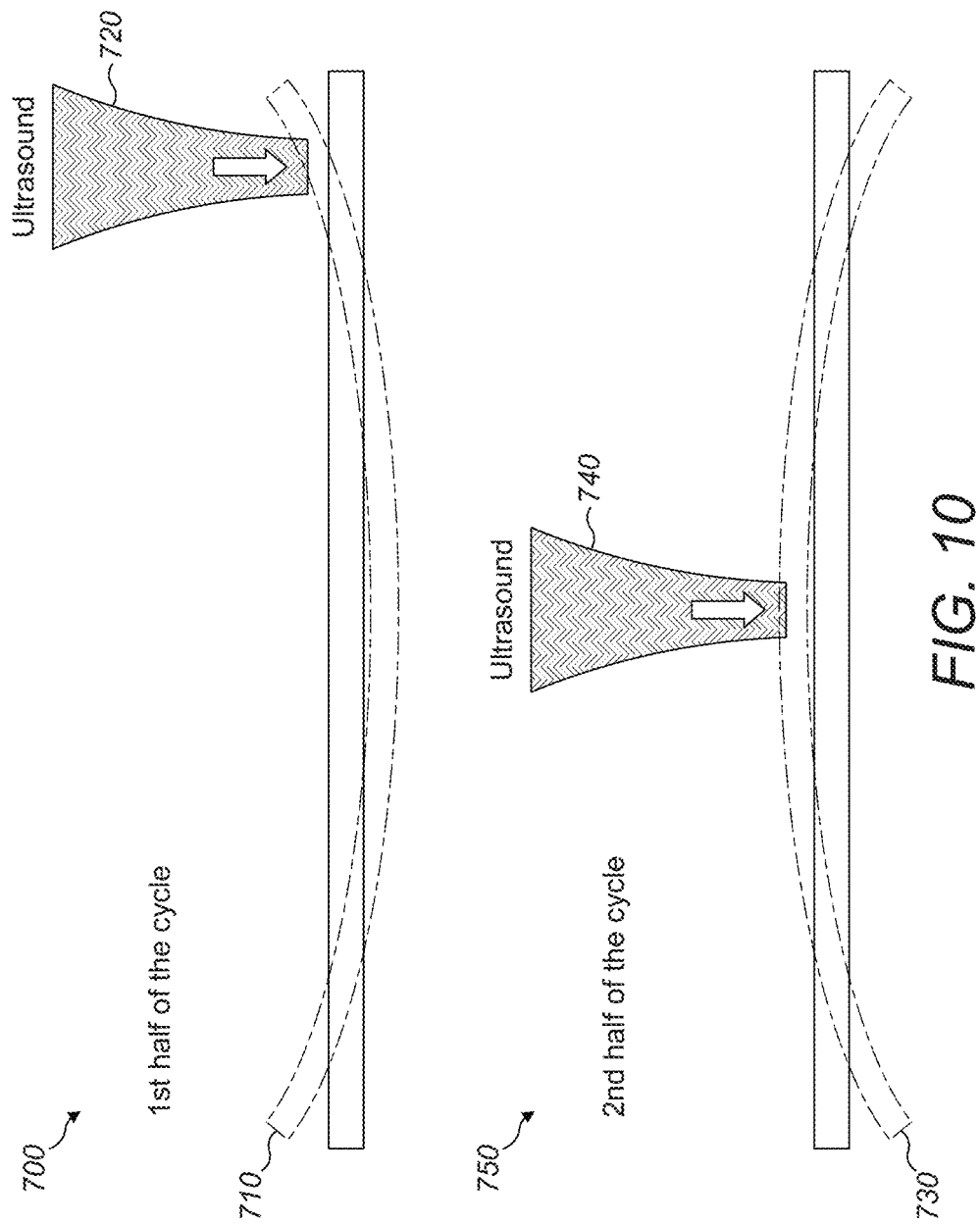

HAPTIC EFFECTS FROM FOCUSED ACOUSTIC FIELDS

RELATED APPLICATIONS

This application claims the benefit of the following two U.S. Provisional Patent Applications, all of which are incorporated by reference in their entirety:
1) Ser. No. 62/590,609, filed Nov. 26, 2017; and
2) Ser. No. 62/691,130, filed Jun. 28, 2018.

FIELD OF THE DISCLOSURE

The present disclosure relates generally to acoustically-driven haptic effects in mid-air haptic systems.

BACKGROUND

A continuous distribution of sound energy, referred to as an "acoustic field", may be used for a range of applications including haptic feedback in mid-air.

In most applications, haptic feedback is generated by an array of transducers, and a user's gesture is recognized by means of an optical camera. By identifying the user's gesture and focusing the acoustic field onto the user, an action is performed and a specific haptic feedback may be provided as a response. Consider an in-vehicle gesture system as an example scenario. In this application, the array may be embedded in the dashboard, whereas the optical camera, needing to view the interaction space, would then be embedded in the roof of the vehicle interior. Their relative position, generally unknown and subject to variability, is a necessary piece of information to ensure that the acoustic field and its resulting haptic feedback is projected at the correct position in mid-air.

While different standard calibration procedures can be adopted to find the relative position between the array and the RGB camera, they all involve some hardware challenges and/or require active human intervention to perform calibration. Human intervention is difficult to achieve, and in the cases in which manual intervention is needed, makes for expensive and time-consuming solutions. For this reason, it is important to minimize human involvement, which makes calibration techniques that achieve this commercially valuable.

Three standard calibration procedures without human intervention are as follows:

1) Microphones embedded in the camera, or positioned in its proximity, can be used to measure the acoustic field from the array. A minimum of three (or more) transducers at known array-referenced positions can be activated at different timings and the signals are received at the microphone. The signal can be a short pulse, chirp sine wave or modulated signal that encodes known points in time. Since the time-of-flight of more than 3 receivers is recorded, the problem becomes one of multilateration, a surveillance technique based on the measurement of the difference in distance to two stations at known locations by broadcast signals at known times. Weighted least squares optimization finds the minima of a cost function which consists of the sum of the squared residual, leading to the estimation of the relative position of the camera with respect to the array. Once the relative position of the camera is determined, a calibration of the system is obtained.

2) A minimum of three or more receivers embedded in the haptic array can record a signal from a transmitting transducer embedded in the camera or in its proximity. The signal can be a short pulse, chirp sine wave or modulated signal that encodes known points in time. Since the time-of-flight of more than three receivers is recorded, the problem becomes one of multilateration. Weighted least squares optimization finds the minima of a cost function which consists of the sum of the squared residual, leading to the estimation of the relative position of the camera with respect to the array. Once the relative position of the camera is determined, a calibration of the system is obtained.

3) One or more fiducial marks on the array, on its proximity or on the covering material, that are in each case visible to the camera can be captured optically. They can be a recognizable spot, or a distinguishable symbol. By comparing the frames acquired by the optical camera with an exemplar, it would be possible to compute the differences between the actual and the ideal position of the array with respect to the camera, and hence calibrate the system.

Presented herein is an alternative, cheaper and more elegant method to capture the same calibration information using only focused acoustic field and the optical camera. This is achieved by magnifying the sinusoidal motion induced by an acoustic field, produced by the array, on the output of the optical camera system. A focused acoustic field exerts forces on the optical camera which induces small motions of the camera. This results in equally small distortions in the image data captured by the camera system. Various techniques can be used to isolate this distortion and quantify temporal variations in videos and still images. The quantized distortion would then be utilized to compare different acoustic fields and perform the calibration.

Further, many applications for haptic feedback involve the vibrations originating from a device the user is holding. This can be as simple as a stylus which taps or vibrates to indicate a selection, or a handle meant to simulate a racket in virtual reality which vibrates as the user hits a (virtual) ball. Traditional approaches require an actuator imbedded in the device, a power source such as a battery, and some sort of controller which can activate the feedback at the appropriate time. This increases the cost of the device.

An ultrasonic array for airborne haptic feedback offers enough energy to activate a new class of passive devices. With careful design, a small device can be designed to receive acoustic energy from the array and then vibrate to create haptic feedback without the need for any kind of active circuitry on the device. This saves cost and relieves the need to charge a battery.

SUMMARY

Adjusting the reading of an optical camera with that of a phased array of acoustic transducers is often needed in many applications, and it is herein referred to as the calibration problem.

The magnification of the motion induced on an optical camera by the acoustic field modulated at specific frequencies, can reveal very small temporal variations in video frames. This quantized distortion would then be utilized to compare different acoustic fields and to solve the calibration problem in a complete, automatized way and without the need of human intervention.

The invention to be described has at least the following novel features:
1. Possibility to solve calibration problems between an optical system and a phased array system;

2. Possibility to calibrate the system in an automatized way, with no need of human intervention;
3. A proposed algorithm for motion magnification;
4. Two proposed methods in quantifying distortion produced by the acoustic field; and
5. A proposed method for the machine path and for decision maker.

Further, mechanical resonators can be excited by ultrasound when it is modulated at the resonant frequency. When enough energy is transferred and when operating at the correct frequency, a user in contact with the device can feel vibration near areas of largest displacement. The invention described here exploits this effect to create devices which can produce haptic feedback while not carrying a battery or exciter when in the presence of an ultrasonic source.

BRIEF DESCRIPTION OF THE FIGURES

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

FIG. 10 shows an illustration of spatio-temporal modulated haptic implement.

Figure 1:
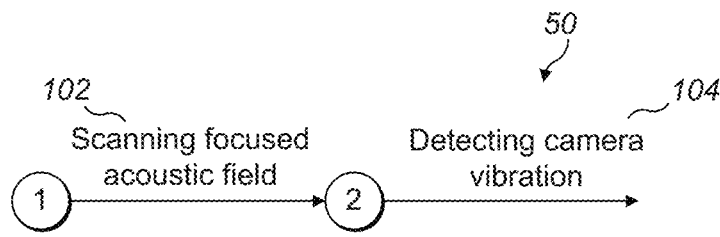
FIG. 1 shows a process of scanning a focused acoustic field and detecting camera vibration.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Motion Magnification

As previously described, the magnification of the motion induced by the acoustic field on an optical camera can reveal small temporal variations in videos. The optical camera lens or camera chassis is excited with focused acoustic waves modulated at specific frequencies. These frequencies should be within the range of detectable frequencies of the optical camera, i.e., smaller than the sampling frequency of the camera. It is possible to apply different types of modulation (amplitude, frequency, phase) of the carrier to obtain the wanted frequency of excitation. The rationale of this method is to compare the amplified motion gradient produced by focal points at different spatial locations: the arrangement generating the largest gradient would give an estimation of the position of the camera. Once the relative position of the camera is determined, a calibration of the system may be performed.

FIG. 1 shows the steps 50 of scanning a focused acoustic field through space from an acoustic source 102 until the focused acoustic field impinges upon an element of a camera with sufficient amplitude to cause camera vibration to a detectable level 104.

This approach combines spatial and temporal processing to amplify tiny motion of a video sequence. The process can be divided into five major steps, which are schematically summarized in the form of a flow diagram in FIG. 2A. Steps two and three are fundamental parts of the well-established Canny edge detector algorithm. The method comprises a first step in which each frame of the video is transformed into a grayscale, single-channel image for ease of processing, and a second step in which each frame is smoothed to remove inherent noise. Subsequently, the first derivative of each frame is computed to reveal edges. This has the aim of improving the detection of motion and sharpening the image. Eventually, a temporal bandpass filter is applied to isolate the motion generated by specific frequencies. The extracted signal is linearly amplified and then is added back to the original signal. A spectral interpolation can be used to further enhance subtle temporal changes between frames.

Figure 2A:
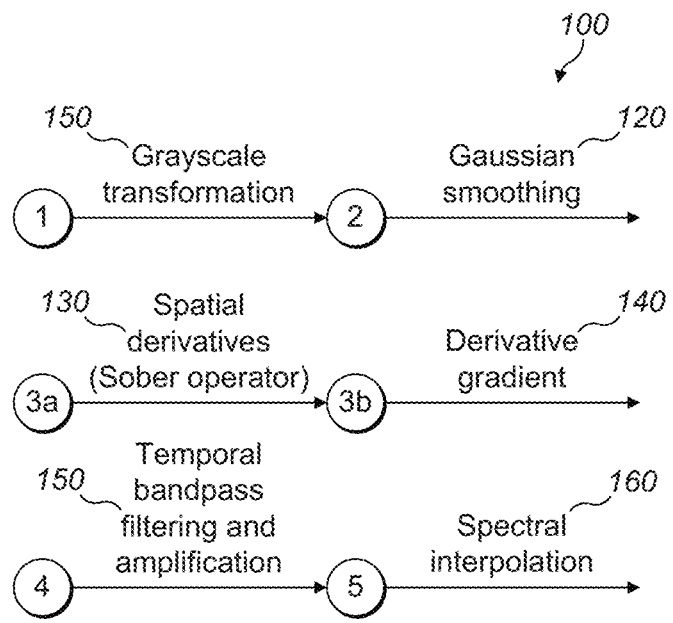
FIG. 2A shows a motion magnification process.

FIG. 2A demonstrates the motion magnification process 100 comprising of the following steps:

1. In step 150, a grayscale transformation of the RGB frame in the case that a full color camera is used, based on one of the common grayscale algorithms (e.g. the Luma algorithm). If a camera that yields output that is a single channel to begin with is used, this step is skipped.

2. In step 120, the application of a Gaussian smoothing for each frame. The Gaussian smoothing operator is a 2-D spatial convolution operator that is used to "blur" images and remove both high-frequency detail and noise in both x and y directions. It uses a kernel that represents the shape of a Gaussian ("bell-shaped") hump, with the following form:

$$G(x, y) = \frac{1}{\sqrt{2\pi}\,\sigma} \cdot e^{(-x^2+y^2/2\sigma^2)}$$

3. In step 130, the application of a Sobel operator to each frame for the detection of edges. The Sobel operator is again a 2-D spatial convolution operator that performs a gradient measurement on an image and so emphasizes regions of high spatial frequency that correspond to edges. In step 140, the Sobel operator can be obtained as the separable convolution of a Gaussian kernel in the direction(s) in which the edges are not to be detected and a differentiation kernel in the direction that crosses the edges to be detected, as follows:

$$G_x = \begin{bmatrix} +1 \\ +2 \\ +1 \end{bmatrix} [+1 \ 0 \ -1] = \begin{bmatrix} +1 & 0 & -1 \\ +2 & 0 & -2 \\ +1 & 0 & -1 \end{bmatrix}$$

$$G_y = \begin{bmatrix} +1 \\ 0 \\ -1 \end{bmatrix} [+1 \quad 2 \quad +1] = \begin{bmatrix} +1 & +2 & +1 \\ 0 & 0 & 0 \\ -1 & -2 & -1 \end{bmatrix}$$

for detecting pixels that cross edges in x and y respectively. For each image pixel, the gradient magnitude can be calculated by the formula:

$$G = \sqrt{G_x^2 + G_y^2}$$

It is possible to obtain Sobel kernels of size $2^{n-1} \times 2^{n-1}$ just by convolving the 3×3 kernel with another smoothing kernel n+1 times.

4. In step 150, the application of a bandpass temporal filter to extract the frequency bands of interest. The motion is magnified by altering some features of the video. The motion magnification is achieved by applying a bandpass temporal filter to the spatially filtered frames of the video. The bandpass filter needs to be chosen according to the frequency that one wants to magnify: it will be a range centered to the value of the carrier/modulation frequency, and in any case lower than the sampling frequency of the camera. The bandpass filtered signal then undergoes a process of linear amplification, before being added back to the original signal, as follows:

$$\tilde{I}(x,t) = \chi \cdot I(x,t)$$

Where $\chi$ is an arbitrarily chosen constant, $I(x,t)$ is the filtered signal and $\tilde{I}(x,t)$ is the amplified signal.

Figure 2B:
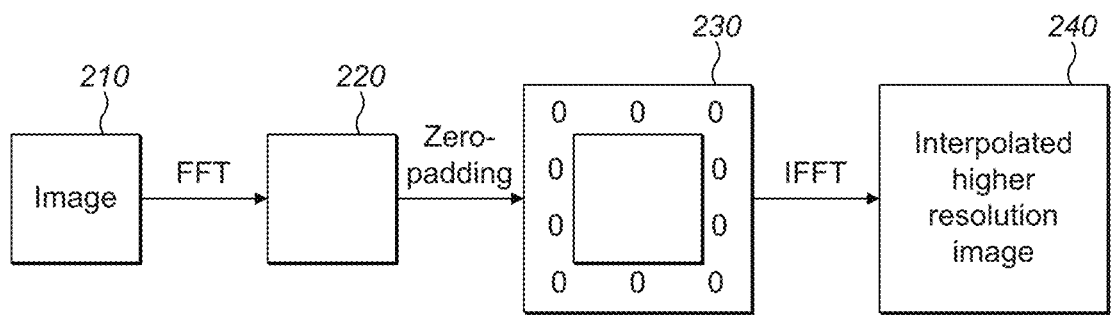
FIG. 2B shows the application of a Gaussian smoothing on an image.

5. In step 160, a two-dimensional spectral interpolation of data achieved by zero-padding in the frequency domain. This stage aims at increasing the sampling rate of each frame and subsequently at helping the recognition of motion. By performing interpolation on a frame sequence, the information held by the pixels of the original frames is transmitted at sub-pixel levels, allowing the possibility to perceive tinier movements. As shown in FIG. 2B, this process 200 is achieved by performing a 2D fast Fourier transform (FFT) 220 of the image 210, followed by an appropriate zero padding of the higher frequencies 230 and a 2D inverse FFT 240.

It is possible to amplify and compare the magnified motion of the aliased frequencies, in the case of the carrier or the modulation frequency falling outside the range of detectable frequencies. As a rule of thumb, the range of frequencies to magnify should be as wide as possible.

Figure 3A:
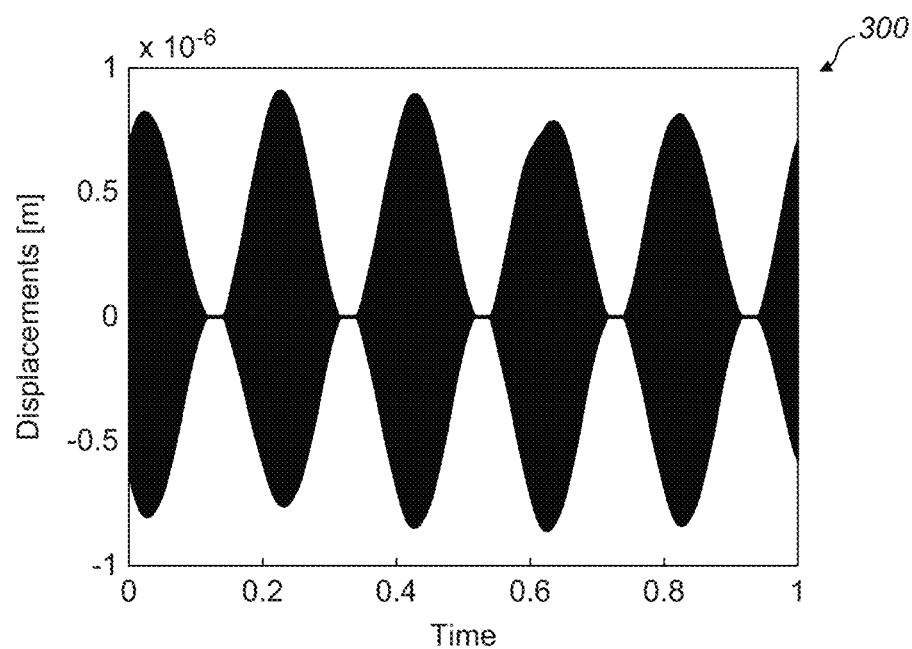
FIGS. 3A and 3B show graphs of motions of an optical camera.
Figure 3B:
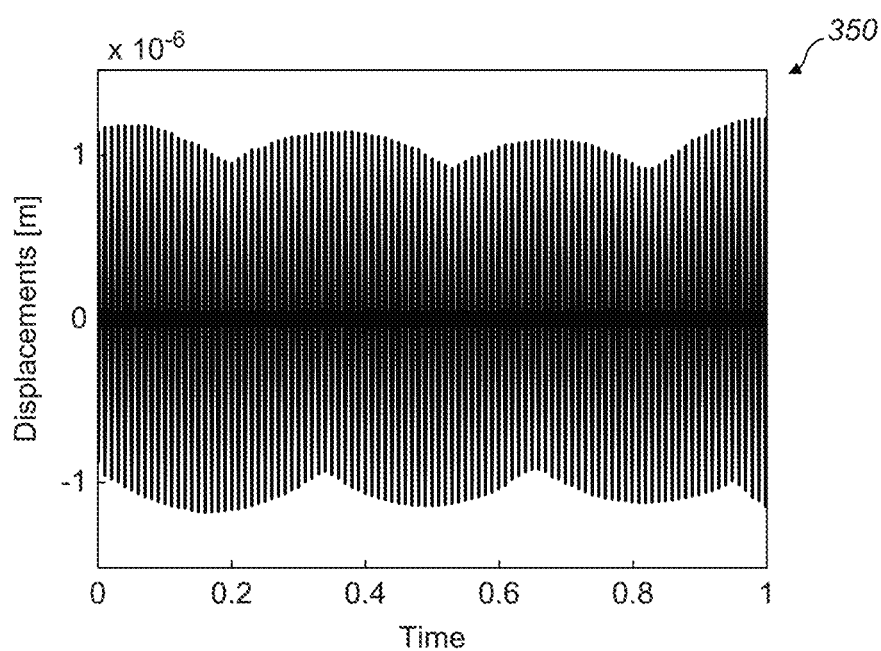

As shown by the accelerometer data, the acoustic field displaces the camera sufficiently to generate a blur in the camera image. This temporally modulated blur is detectable through a contrast detection algorithm. Shown in FIGS. 3A and 3B are the actual motions of an optical camera type "Ausdom 1080p 12 M full HD", recorded by means of an accelerometer mounted on its body. These figures show that this motion magnification method successfully achieved visible results for sinusoidal displacements with amplitudes up to 2 micrometers peak-to-peak. This is shown as graph 300 in FIG. 3A for a 40 kHz sinusoidal carrier amplitude-modulated at 5 Hz, and as graph 350 in FIG. 3B, when the same carrier is amplitude-modulated at 100 Hz. A focused acoustic field was produced with a root means squared (RMS) pressure of about 1 kilopascal at 20 cm.

II. Still-Frame Contrast Detection

In some applications, measuring contrast in fixed frame images from the motion-tracking camera may provide another method in quantifying distortion produced by the acoustic field.

Figure 4:
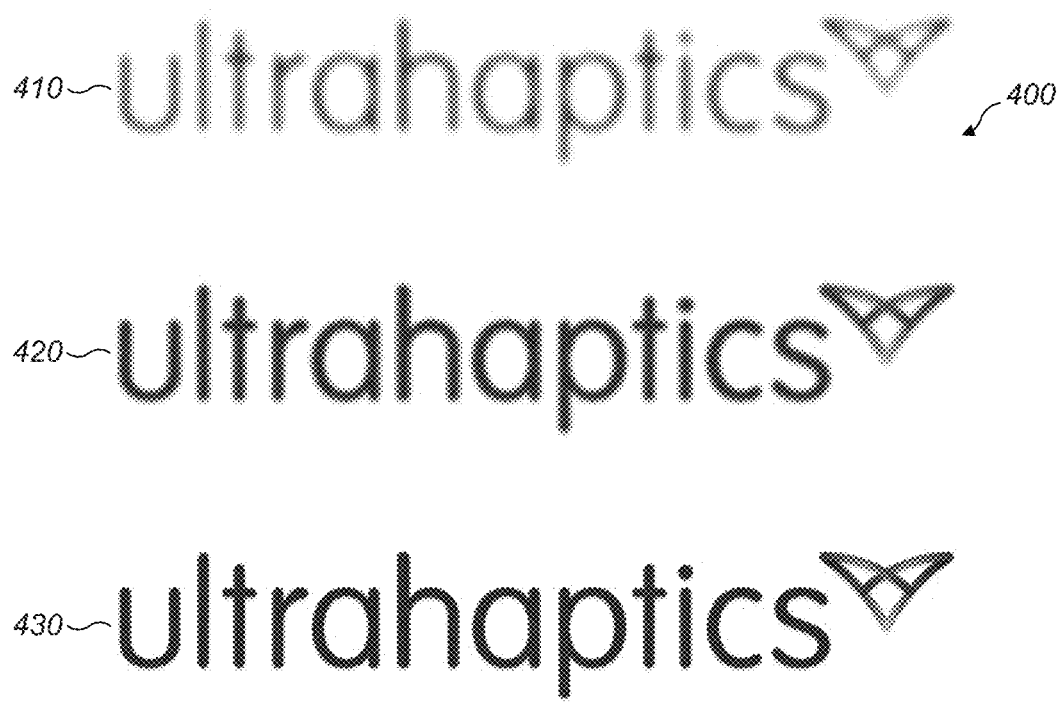
FIG. 4 show text in various levels of focus.

Contrast-detection algorithms are common in mirrorless cameras and other applications where phase detection is either too expensive or too bulky to implement. Contrast detection functions on the basic concept that a scene which is out of focus tends to blur objects and will cause adjacent pixels to average their values. This reduces contrast. By implementing a function which quantifies the contrast in an image, the camera system can move its lens to a position which maximizes this function and thereby will optimize its focus. FIG. 4 shows an example of a set of images 400 that have varying levels of contrast from the least focused (lowest contrast) 410, to medium focused (middle contrast) 420, to the most focused (highest contrast) 430.

The contrast detection as discussed herein will be used to quantify defocusing caused by the acoustic field. The shutter speed of the camera needs to be comparable to the period of modulation of the sound field. In this way, the image will be blurred by motion of the camera's focusing lens. By comparing the contrast of the standard image without stimulation to the one with acoustic stimulation, one can quantify the effect of the acoustic field and progress towards optimal calibration. Maximum defocusing (minimum contrast) will be correspond to a specific relative orientation and calibration will be possible. The background which is being imaged during calibration needs to be as static as possible to avoid false minimums. Regions with possible changes such as shiny surfaces containing reflections could be excluded from analysis.

Contrast quantifying algorithms include, but are not limited to, summed magnitude difference of adjacent pixels, summed magnitude squared difference of adjacent pixels, and summed magnitude difference of adjacent bins in the intensity histogram. Both grayscale and color information can be used. The ideal algorithmic implementation will depend on the variables including the camera used as well as the environment imaged during calibration.

III. Machine Path and Decision Maker

The final goal of the calibration process is to find the focus produced by phased array systems that maximizes the displacements of the camera apparatus. The decision on the final displacement and on displacement direction is based on the value of the gradient between different frames (or a sensible portion of the frame, e.g. where edges are more pronounced) of a video sequence. A general gradient algorithm for decision making is the following for the motion magnification algorithm:

$$\sum_{i=1}^{n-1} \sum_{x=1}^{N} \sum_{y=1}^{M} \left\| \tilde{I}(x,y)_n - \tilde{I}(x,y)_{n+1} \right\|$$

where n refers to the frame, N is the width of the frame, M is the height of the frame, $\tilde{I}(x,y)_n$ is the intensity of the pixel belonging to the x-th row, to the y-th column and to the n-th frame, after the motion magnification is performed (as explained in the previous section of this document). The function of merit for the contrast method is simply an application of the contrast formula deemed most effective in the application.

The machine would ideally scan a portion of space where the camera is believed to exist. The machine could scan this portion of space following a regular pattern, since the space could be discretized in a regular grid of equally distant points with different x, y, z coordinates. Alternatively, the machine could scan the space in a random fashion, following a heuristic approach that resembles the Monte Carlo algorithm for optimization problems. Points to scan are sampled at random from an input probability distribution. For example, if a normal distribution is chosen, the mean could be the expected camera position and the standard deviation is chosen based on the expected variation in position derived from the manufacturing tolerances. The probability distribution would then be updated based on increasing knowledge of the camera location. Finally, the optimum point between the scanned ones is the focus which maximizes the value of the gradient algorithm M or minimizes the contrast.

IV. Haptic Effects on Resonators Resulting from Ultrasound

Mechanical resonators can be excited by ultrasound when the ultrasound is modulated at the resonant frequency. When enough energy is transferred and when operating at the correct frequency, a user in contact with the device can feel vibration near areas of largest displacement. The invention described herein exploits this effect to create devices that can produce haptic feedback while not carrying a battery or exciter when in the presence of an ultrasonic source.

To illustrate this principle, a simple resonator may be evaluated having a thin bar of rectangular cross section, with one dimension much smaller than the other two, and one much larger. Along the long dimension forms a series of modes related to the largest length. If the ends are left unclamped, they become anti-nodes and the frequencies supported by the rod are represented by sinusoids satisfying this condition with the displacement normal to the narrowest dimension.

Figure 5:
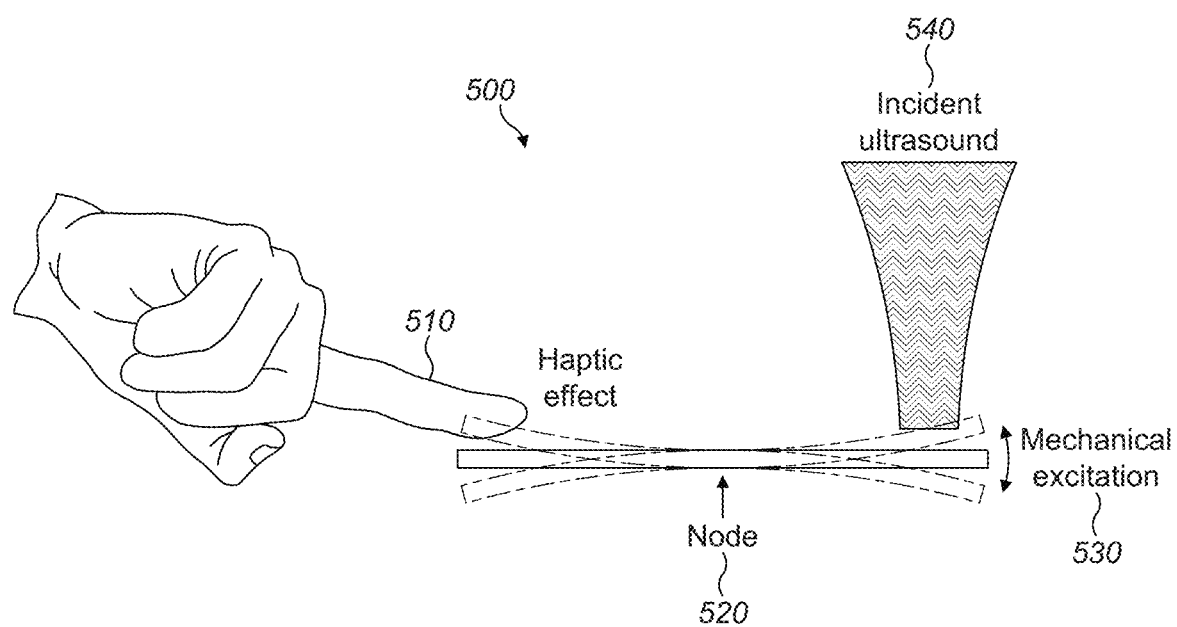
FIG. 5 shows haptic effects on a bending rod.

Shown in FIG. 5 is an illustration 500 of a simple bending rod haptic implement. Ultrasound 540 is incident on the right side of the device which creates bulk mechanical vibration 530 that can be felt by a user 510 touching or holding the device. This example illustrates the major features that will need to be adapted for the desired form-factor: a haptic region which the user is in contact with, whose displacement is felt, and a receive region which accepts activation from an ultrasonic source and is mechanically connected to the haptic region forming a resonator.

The lowest order mode will have a node 520 (with zero-displacement) in the center of the rod and large displacement on the ends. In the context of this example, a user may hold onto one end of the rod, leaving the other end exposed.

Ultrasound modulated at the fundamental frequency of the resonator may be directed perpendicular to the rod on the other end. When activated, the rod vibrates, and the user 510 receives haptic feedback. This example neatly divides the device into two regions: a haptic region and a receive region. The haptic region is the area which is in contact with the user and is vibrating to give feedback to the user and is not necessarily always available for reception of ultrasound. The receive region also has large displacement but is designed to be continuously exposed to an ultrasonic source during operation.

This example also illustrates possibilities for multiple-frequency of vibration in the same device: higher-order modes will be at higher frequencies, but the locations of largest-displacement will be similar (the ends). As necessary, the ultrasonic source may be modulated at the desired frequency to change the feedback. Alternatively, multiple frequencies may be excited simultaneously to form sophisticated haptic waveforms. It should be noted that it is not necessary to have maximum displacement in the same location. A design may be implemented to have different frequencies target different locations.

Design of haptic regions may focus on frequency and displacement. Frequencies may be selected to maximize the sensitivity of the nerves targeted. The fingers, for instance, range from 4 Hz to 400 Hz. Resonating at those frequencies for a hand-held device w-ill maximize the sensitivity. Multiple frequencies may be combined to create distinct effects. Displacement is the fundamental attribute that dictates the strength of the haptic and needs to be considered based on the application and strength desired. A textured surface may be present at one or more haptic regions to both attract the user's grip and potentially change the haptic feel.

Design of receive regions should focus on direction of likely ultrasound, exposure, the area of the region, and quality-factor (Q-factor). Ultrasound carries momentum parallel to its direction of propagation. A receive region should be made of a high-acoustic-impedance material to reflect the pressure for maximum impulse transfer. The difference between the incident and reflected momentum vectors will be the imparted momentum to the resonator. A design may maximize the likelihood that this is parallel to the desired resonant mode displacement. This involves orienting the receive region towards the likely direction of incident ultrasound. Multiple receive regions may be included on the same device facing a variety of directions to maximize the likelihood of facing an acoustic array while the user is moving it.

Figure 6:
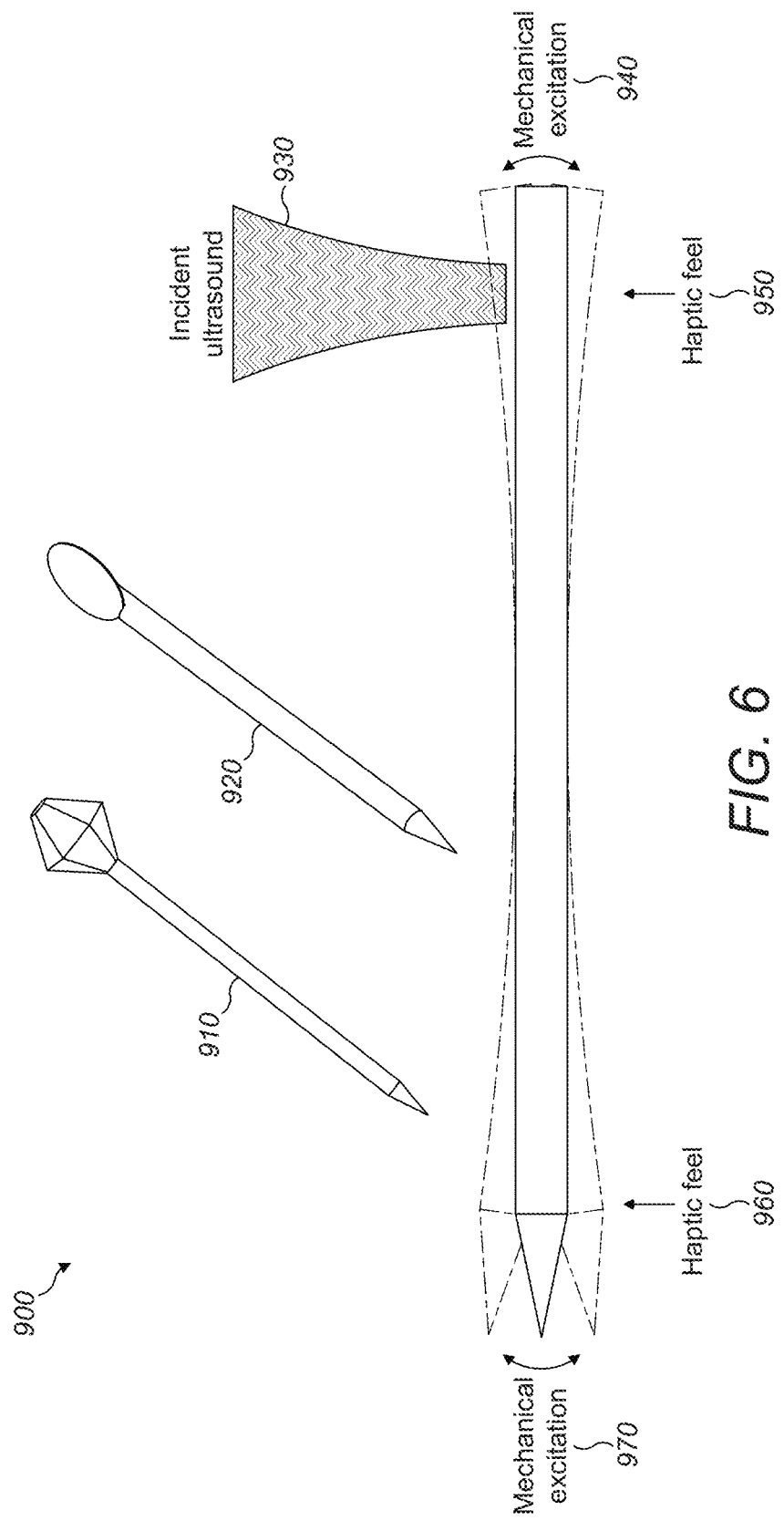
FIG. 6 shows haptic effects on a pencil-shaped form factor.

FIG. 6 shows illustrations 900 of a stylus/pen form factor. In this example, the receive region is located at the rear of the implement where it is unlikely to be obstructed by the user. Shown are two variants of the receive region, an oval 920 that receives from only one direction (normal) and a hexagon 910 that can receive from a multitude of normal directions. The incident ultrasound 930 causes mechanical excitation at the ends of the stylus/pen 970, 940, which produces haptic feel at the ends of the stylus/pen 960, 950. This vibration mode shown consists of oscillations only up and down within the plane of the diagram. If a user grasps around the pen perpendicular to this direction, he or she will receive a sheering force instead of the typical pushing force, giving a unique haptic sensation.

Figure 7:
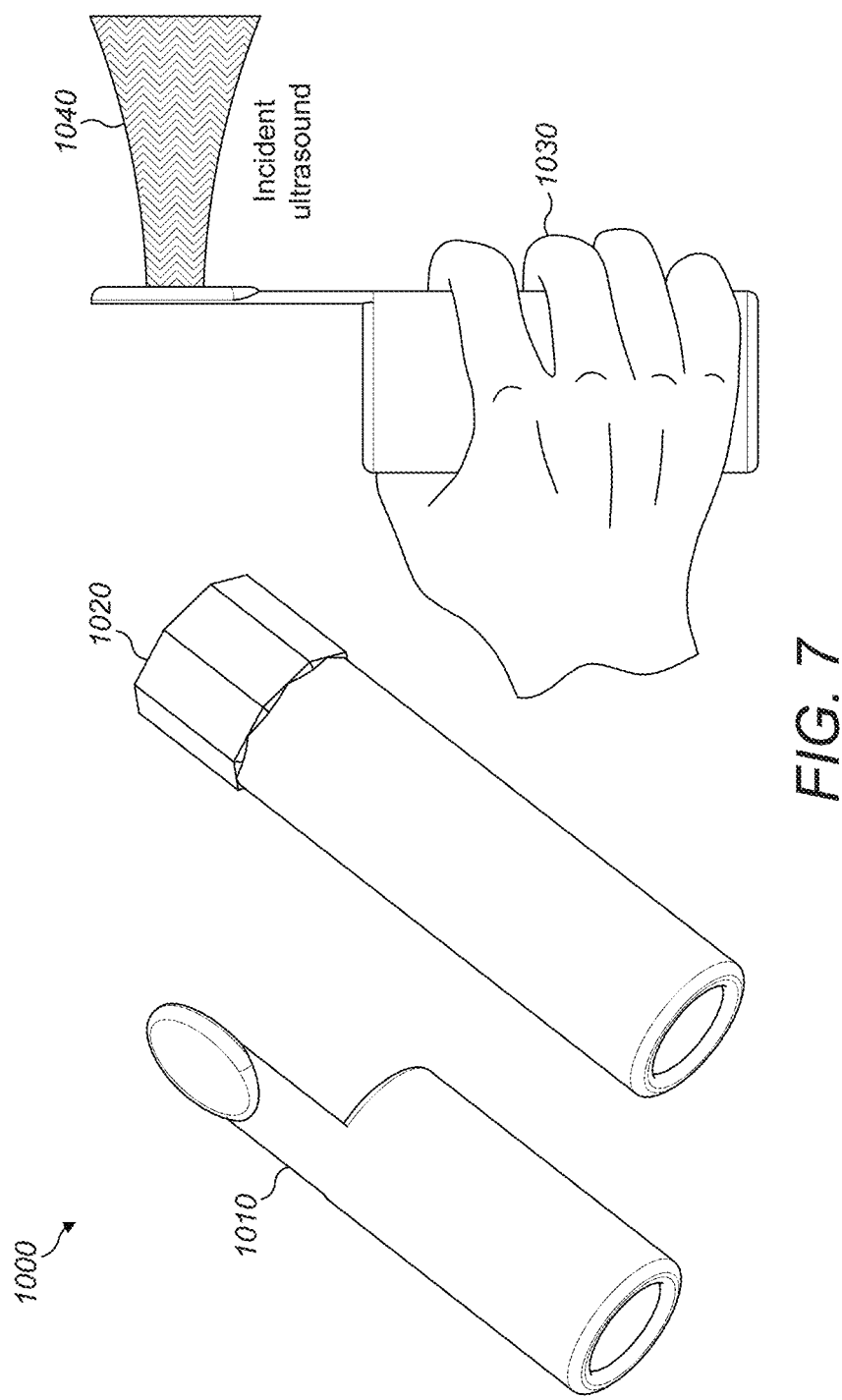
FIG. 7 shows haptic effects on a handle-shaped form factor.

FIG. 7 shows illustrations 1000 of a potential handle-like haptic implement. This could be used to mimic the feel of a racket or bat for VR/AR applications. Shown are two variants of the receive region—an oval 1010 that is sensitive only to its normal direction and a multi-faceted receiver 1020 that can couple to ultrasound from a number of normal directions. The incident ultrasound 1040 causes the user 1030 to feel haptic effects.

Figure 8:
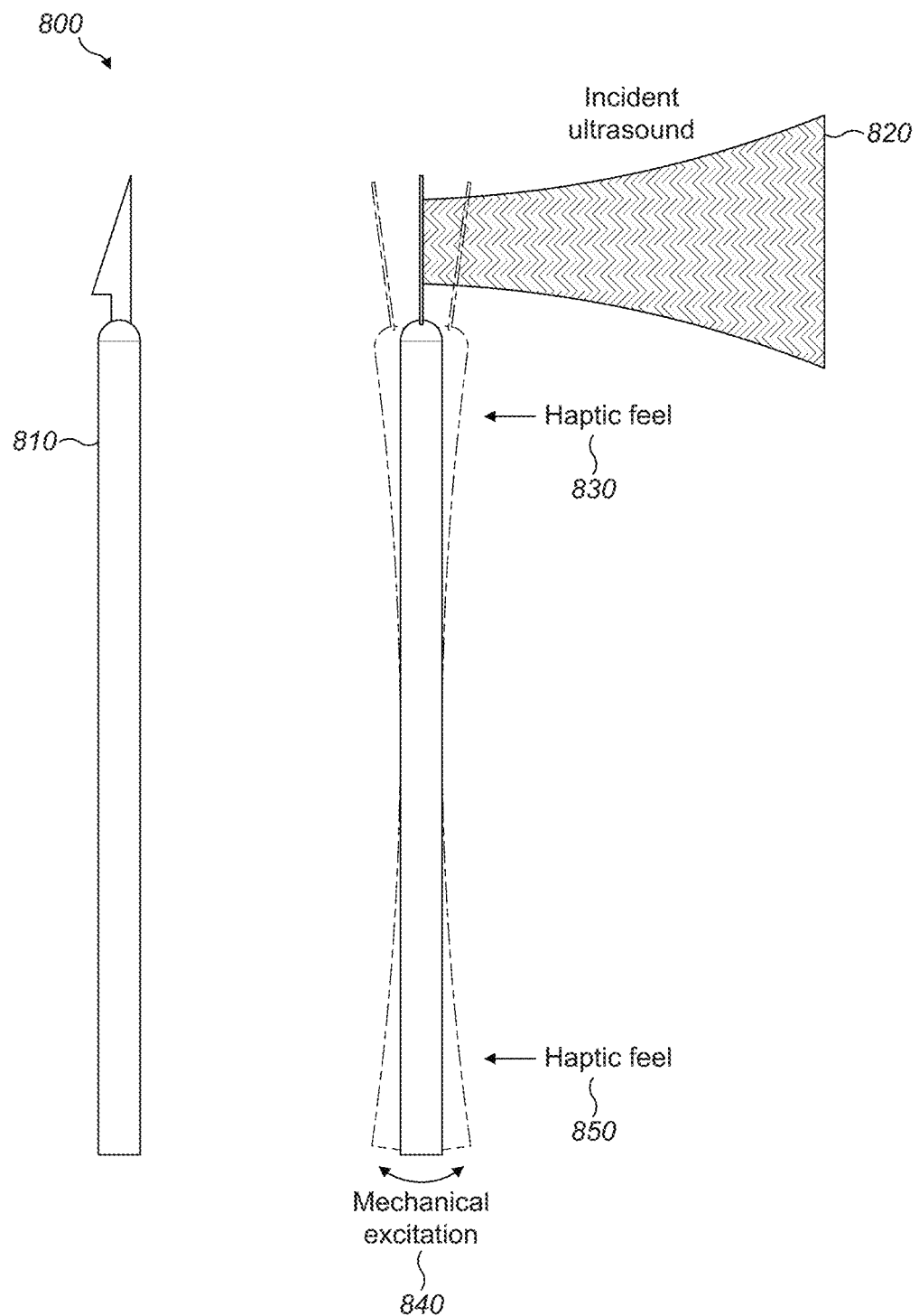
FIG. 8 shows haptic effects on a knife-shaped form factor

The area of reflection integrates the available momentum transfer. If focused ultrasound is used, scaling the size of the receive region to match the expected focus waist will maximize the possible coupling. This is shown in FIG. 8 where an illustration 800 demonstrates the receive region is integrated seamlessly into the device by using any flat surface such as the edge of a knife 810. The incident ultrasound 820 is applied to the knife edge, causing mechanical excitation on the opposite edge 840 of the knife and producing haptic feel on both edges 830, 850.

Furthermore, Q-factor relates to the time the resonator takes to ring up and ring down. This is influenced by the materials used (metal versus plastic versus rubber, etc.) as well as the attachment points and grip of the user. A large Q-factor (slow ring up and down) makes the device maximally sensitive to incident ultrasound but at the cost of precision—it will take more time to activate and deactivate the haptic. In that time, the user could move the implement away from the intended region of haptic feedback. A low-Q device can be very precise but will suffer from limited max amplitude when compared to the high-Q device. With sufficient ultrasonic energy, a low-Q device can be made both precise and strong enough for strong feedback. If ultrasonic energy is limited in the intended environment, a high-Q device will likely work better. If well characterized, a high-Q device will have a predictable phase response to ultrasonic stimulus and could be driven out of phase to stop haptics to improve ring down.

Figure 9:
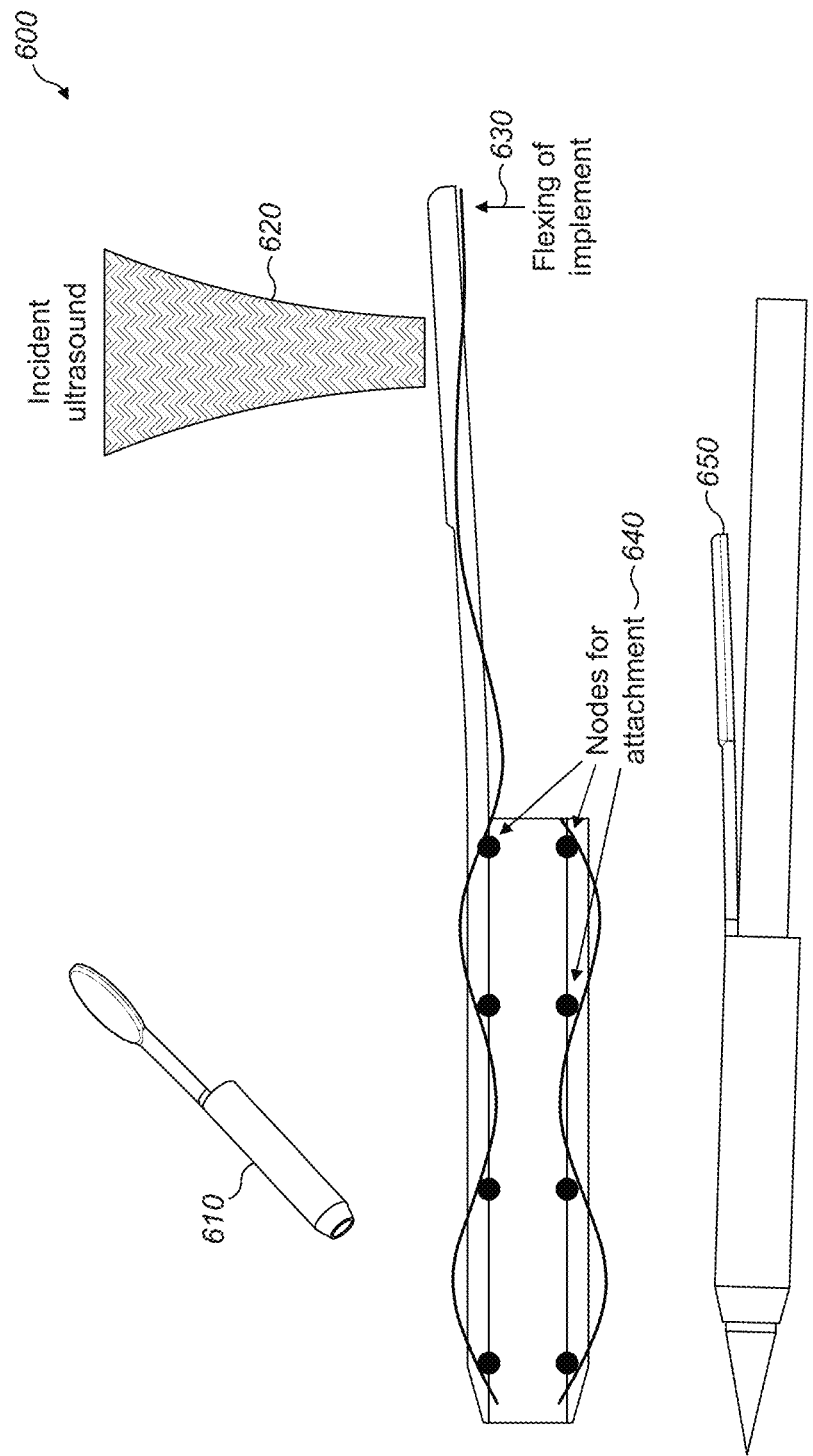
FIG. 9 shows haptic effects on an implement designed in the form factor of a tube that is to be grasped like a pen.

FIG. 9 shows an illustration 600 of a passive haptic implement designed in the form factor of a tube that is to be grasped like a pen from the outer diameter 610 and designed to hold a stylus or pen. The pen/stylus 650 is inserted in the tube and secured along vibratory nodes 640. A receive area for the incident ultrasound 630 may protrude from the device. When a user grasps the implement, the pen/stylus could be used as normal. When the haptic implement is excited with ultrasound, there is a flexing of the implement 630 a haptic effect would be felt by the user.

Most resonators will have some points of little-to-no movement frequently called "nulls" or "nodes" 640. These can serve as opportunities for attachment to other devices without losing energy into that device. The device is designed to have radial flexing modes to provide haptic and receive regions. Between these regions, nodes will exist which could provide an opportunity for attachment to a stylus or pen down the axis of the tube. The attachment may be designed to allow the stylus to slip in and out but still gripped securely enough to allow use. The sharper the contact point and the precision of the contact with the null minimizes the effect on the haptics.

Excitation through modulation may be achieved with amplitude or spatio-temporal modulation. Amplitude modulation varies the pressure magnitude versus time, effectively turning it on and off at a given frequency or frequencies. Spatio-temporal modulation achieves the same stimulus at a given point by steering the intensity of the field away and then back again at the desired frequency. An amplitude modulated field may effectively activate a haptic region by simply being directed towards it, but by its nature eschews half of its power through modulation.

The receive region may also be activated via spatiotemporal modulation by directing the field away from the receive region and back again. While away it could be used for direct mid-air haptics on the user or some other purpose.

Alternatively, a haptic implement may be designed with two receive regions nearby each other but designed to be driven out of phase. FIG. 10 shows an illustration of a possible spatiotemporal modulation excited haptic implement. For the first half of the vibratory cycle 700, the acoustic field 720 is directed to the end of the implement 710. For the second half of the cycle 750 the acoustic field 740 is directed to the middle of the implement 730. This allows continuous, full-power excitation of the implement. In this way, the ultrasound may be directed at one, transitioned to the second, and then back again. This allows for the full power of the ultrasound source to be utilized at all times. In another arrangement, the two haptic regions to be excited out of phase can be driven simultaneously with two amplitude modulated fields whose modulation is out of phase. This also allows for maximum utilization of available ultrasonic power.

Descriptions of haptic implements thus far presume displacement normal to the surface of the implement and into the user. In another arrangement, a passive implement may be designed which contains oscillations not entirely normal to the user contact. This provides a unique haptic experience relative to normal-oriented motion. As an example, a simple rod with the aspect ratio of a pencil could be designed with a flexing mode down its length (as in FIG. 6). When a flat is cut into one end as a receive region and oriented "up" and the flat is activated with ultrasound oriented "down," this will cause displacement confined to a plane along the length of the rod and the up-down direction. If grasped along the sides of this imaginary plane, the user's fingers will experience displacement perpendicular to the skin. If another flat is provided perpendicular to the first, it may be activated at the same frequency yet provide a unique haptic to the first activation region.

Implements may be designed to be adjustable in their form. By rotating one end of the device through a joint (held mechanically or magnetically) the user may change the nature of the resonator. This may change the location of the haptic or receive regions. It may also affect the Q-factor, amplitude or resonant frequency. Besides rotation, the user may adjust a joint or any other form of mechanical connector.

In regions with limited but steerable ultrasound, optimal coupling may be achieved by steering and/or focusing the ultrasound directly at the receive region of the haptic implement. In this application, tracking the receive regions efficiently may be necessary and can be designed into the implement. Options for tracking include, but are not limited to:

Visual or IR fiducials placed on the implement that are designed to be recognized and tracked by a camera system. This can take the form of a simple sticker or as sophisticated as a retroreflector which will light up when exposed to incident light.

A specific acoustic reflecting shape contained on the implement which forms a recognizable reflection. The reflected acoustic signal would be recorded with microphones placed in the area which would identify and track the implement. This can be as simple as a flat reflector or some shape which forms a structured reflection field.

A powered element within the implement that provides tracking information. This may be a Bluetooth or some similar wireless protocol. Tracking information may be determined with a pickup mic to detect the receive ultrasound. It may be a vibration pickup to measure the haptic receive. The element can emit light or some other form of electromagnetic radiation which is picked up with external receivers. Alternatively, it can pick up and interpret tracking information provided by scanning base stations or similar structured information. Accelerometer data may be captured and transmitted as well.

Mechanical vibration may be harvested to power electronics using piezoelectric materials. By bonding a piezo film or crystal strategically to the implement, they could be hidden from view and not significantly affect haptics. In another arrangement, they could be used to aggressively change (or even completely stop) haptics by modulating their power draw. The power delivery could in this case, be independent of haptics. The energy can be temporarily stored and used to power any number of electronics on the device including but not limited to: displays, tracking emission/reception, and radios.

Example form factors include:

A rod intended to emulate a pen or scalpel.

A tube which is designed to have a stylus inserted.

A larger tube or rod meant to emulate the size and shape the handle of a racket, golf club, or bat (as in FIG. 7).

A glove with resonators placed in various places such as the back of the hand which are not as sensitive to traditional mid-air haptics.

A face mask.

A full-body suit with many different resonators matched to the specific locations on the body.

A game piece, figurine, model, or toy.

Further description of these embodiments may be as follows:

1. A method to provide haptic feedback comprising:
   a. A device with at least one mechanical resonance frequency;
   b. A receive surface designed to receive acoustic energy modulated at that frequency;
   c. Once acoustic energy is received, vibrates at another location on the device; and
   d. This second (haptic) location can be in contact with a user to provide haptic feedback.
2. The method as in paragraph 1 where the device has multiple resonant frequencies
3. The method as in paragraph 2 where the different resonant frequencies have unique second (haptic) locations.
4. The method as in paragraph 2 where the different resonant frequencies have unique receive regions.
5. The method as in paragraph 1 where the device is attached to another device through mechanical nodes.
6. The method as in paragraph 1 where there are multiple receive locations for the same frequency which are out of phase.
7. The method as in paragraph 1 where the Q-factor of the resonator may be manipulated by the user.
8. The method as in paragraph 1 where the Q-factor of the resonator may be manipulated by the acoustic field.
9. The method as in paragraph 1 where the displacement of the second (haptic) region is designed to be perpendicular (sheer) to the contact of the user.
10. The method as in paragraph 1 where the receive region is tracked using electromagnetic waves.
11. The method as in paragraph 1 where the receive region is tracked by reflected acoustic energy.
12. The method as in paragraph 1 where the receive region is tracked using a signal emitted from a control device on the implement.
13. The method as in paragraph 1 where energy is harvested from the vibration of the implement.
14. The method as in paragraph 13 where the energy is harvested using an attached piezoelectric material.
15. The method as in paragraph 13 where the energy is used to power electronics embedded in the implement.

V. Conclusion

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method comprising:
   scanning a focused acoustic field through space from an acoustic source until the focused acoustic field impinges upon an element of a camera with sufficient amplitude to cause vibration of the camera to a detectable level; and
   estimating a relative location of the camera to the acoustic source based on the vibration of the camera.

2. The method as in claim 1, further comprising:
   detecting a camera imager blur via a contrast detection algorithm.

3. The method as in claim 2, wherein the contrast detection algorithm compares a standard camera image contrast with a vibrating camera image contrast.

4. The method as in claim 3, wherein the contrast detection algorithm further comprises excluding regions with possible changes.

5. The method as in claim 3, further comprising:
determining a focus produced by the acoustic source that maximizes camera displacement.

6. The method as in claim 3, wherein the contrast detection algorithm further comprises spatial and temporal processing to amplify the camera imager blur.

7. The method as in claim 2, wherein the focused acoustic field includes a modulated carrier wave.

8. The method as in claim 7, wherein the modulated carrier wave is calibrated to obtain a desired frequency of camera vibration.

9. The method as in claim 1, further comprising:
detecting camera motion via a motion magnification algorithm.

10. The method as in claim 9, further comprising:
detecting a camera imager blur via a contrast detection algorithm.

11. The method as in claim 10, wherein the contrast detection algorithm compares a standard camera image contrast with a vibrating camera image contrast.

12. The method as in claim 11, wherein the contrast detection algorithm further comprises excluding regions with possible changes.

13. The method as in claim 11, further comprising:
determining a focus produced by e acoustic source that maximizes camera displacement.

14. The method as in claim 11, wherein the contrast detection algorithm further comprises spatial and temporal processing to amplify the camera imager blur.

15. The method as in claim 10, wherein the focused acoustic field includes a modulated carrier wave.

16. The method as in claim 15, wherein the modulated carrier wave is calibrated to obtain a desired frequency of camera vibration.

* * * * *

UNITED STATES PATENT AND TRADEMARK OFFICE
CERTIFICATE OF CORRECTION

| | | |
|---|---|---|
| PATENT NO. | : 11,921,928 B2 | |
| APPLICATION NO. | : 18/066267 | |
| DATED | : March 5, 2024 | |
| INVENTOR(S) | : Iodice et al. | |

It is certified that error appears in the above-identified patent and that said Letters Patent is hereby corrected as shown below:

In the Claims

Column 14, Line 8, in Claim 13, delete "e" and insert -- the --

Signed and Sealed this
Ninth Day of April, 2024

Katherine Kelly Vidal
*Director of the United States Patent and Trademark Office*